US011993484B2

(12) United States Patent
Venho et al.

(10) Patent No.: US 11,993,484 B2
(45) Date of Patent: May 28, 2024

(54) ELEVATOR ARRANGEMENT AND METHOD

(71) Applicant: Kone Corporation, Helsinki (FI)

(72) Inventors: Anssi Venho, Helsinki (FI); Janne Mikkonen, Helsinki (FI); Markku Haapaniemi, Helsinki (FI); Matti Rasanen, Helsinki (FI); Otto Lanz, Helsinki (FI); Janne Laine, Helsinki (FI)

(73) Assignee: KONE Corporation, Helsinki (FI)

( * ) Notice: Subject to any disclaimer, the term of this patent is extended or adjusted under 35 U.S.C. 154(b) by 0 days.

(21) Appl. No.: 17/739,513

(22) Filed: May 9, 2022

(65) Prior Publication Data

US 2022/0259012 A1 Aug. 18, 2022

Related U.S. Application Data

(63) Continuation of application No. PCT/EP2020/087424, filed on Dec. 21, 2020.

(30) Foreign Application Priority Data

Dec. 19, 2019 (EP) .................................... 19218012

(51) Int. Cl.
*B66B 11/00* (2006.01)
*B66B 7/02* (2006.01)
(Continued)

(52) U.S. Cl.
CPC ............ *B66B 11/0045* (2013.01); *B66B 7/02* (2013.01); *B66B 9/00* (2013.01); *B66B 19/002* (2013.01)

(58) Field of Classification Search
CPC . B66B 11/0045; B66B 19/005; B66B 19/002; B66B 7/02; B66B 9/00
See application file for complete search history.

(56) References Cited

U.S. PATENT DOCUMENTS

2010/0018809 A1 1/2010 Peacock et al.
2011/0113720 A1* 5/2011 Peacock ................. B66B 19/00 187/254
(Continued)

FOREIGN PATENT DOCUMENTS

CN 103402901 A 11/2013
CN 104379488 A 2/2015
(Continued)

OTHER PUBLICATIONS

Machine translation of WO 2015/003964.*
(Continued)

*Primary Examiner* — Diem M Tran
(74) *Attorney, Agent, or Firm* — Harness, Dickey & Pierce, P.L.C.

(57) ABSTRACT

The invention relates to an elevator arrangement, comprising a hoistway one or more vertically oriented guide rail lines in the hoistway for guiding vertical movement of one or more movable elevator units, and one or more movable elevator units mounted in the hoistway vertically movably along one or more guide rail lines, including at least an elevator car, preferably also a counterweight, and a hoisting roping; a movable support structure mounted in the hoistway for supporting said one or more movable elevator units below it via said hoisting roping, and a hoisting machine on the movable support structure for moving the hoisting roping, for thereby moving said one or more movable elevator units. Said movable support structure comprises a body portion, and a shelf structure projecting laterally from the body portion, and the hoisting machine is mounted on the shelf structure. The invention also relates to a method for constructing an elevator implementing the arrangement.

21 Claims, 8 Drawing Sheets

(51) Int. Cl.
*B66B 9/00* (2006.01)
*B66B 19/00* (2006.01)

(56) References Cited

U.S. PATENT DOCUMENTS

| | | | | |
|---|---|---|---|---|
| 2012/0291395 | A1* | 11/2012 | Plathin | B66B 19/02 52/741.1 |
| 2014/0231179 | A1* | 8/2014 | Alasentie | B66B 19/00 187/251 |
| 2018/0273349 | A1 | 9/2018 | Weibel et al. | |
| 2021/0245997 | A1* | 8/2021 | Rasanen | B66B 9/02 |

FOREIGN PATENT DOCUMENTS

| | | | | |
|---|---|---|---|---|
| CN | 105358468 | A | 2/2016 | |
| CN | 106103328 | A | 11/2016 | |
| CN | 109019209 | A | 12/2018 | |
| CN | 209052240 | U | 7/2019 | |
| EP | 1593641 | A1 * | 11/2005 | B66B 19/005 |
| EP | 3872019 | A1 * | 9/2021 | B66B 11/0045 |
| WO | WO-2000/07923 | A1 | 2/2000 | |
| WO | WO-02079067 | A1 * | 10/2002 | B66B 11/0045 |
| WO | WO-2011148033 | A1 * | 12/2011 | B23P 17/00 |
| WO | WO-2015003964 | A1 * | 1/2015 | B66B 19/00 |
| WO | WO-2016096694 | A1 * | 6/2016 | B66B 11/0045 |
| WO | WO-2019238530 | A1 * | 12/2019 | B66B 19/002 |

OTHER PUBLICATIONS

International Search Report and Written Opinion for International Application No. PCT/EP2020/087424 dated Mar. 18, 2021.
European Search Report for European Application No. 19218012.3 dated Jun. 23, 2020.
Chinese Office Action dated Mar. 29, 2024 issued in Chinese Patent Application No. 202080087190.9.

* cited by examiner

ELEVATOR ARRANGEMENT AND METHOD

CROSS-REFERENCE TO RELATED APPLICATION

This application is a continuation of PCT International Application No. PCT/EP2020/087424 which has an International filing date of Dec. 21, 2020, and which claims priority to European patent application number 19218012.3 filed Dec. 19, 2019, the entire contents of both of which are incorporated herein by reference.

FIELD OF THE INVENTION

The invention relates to an elevator arrangement and a method for constructing an elevator. The elevator is preferably an elevator for transporting passengers and/or goods.

BACKGROUND OF THE INVENTION

In connection with so-called jump-lifts, the bottom part of an elevator hoistway is taken into use before the building has been completed. In this case the upper parts of the building as well as the top part of the elevator hoistway can be constructed at the same time as an elevator moving in the bottom part of the elevator hoistway already serves people on the lower floors of the building under construction. Typically in jump-lifts the elevator car moving in the lower parts of the elevator hoistway is supported and moved during construction-time use with a hoisting machine supported on a vertically movable support structure in the elevator hoistway.

When the elevator hoistway under construction above the vertically movable support structure has reached a sufficient stage of completion, the completed part of the elevator hoistway can be taken into use. At this stage a "jump" is performed, wherein the vertically movable support structure is hoisted higher in the elevator hoistway. Thereafter, the car can reach a higher position than before the jump and start to serve additional floors.

The car can be suspended from the movable support structure during its use for transporting passengers and/or goods below the movable support structure with a hoisting roping hanging from the movable support structure.

A drawback of the known solutions has been that it has been particularly difficult to optimize the layout of the overall arrangement such that many demanding requirements of a jump lift are fulfilled at the same time. This has largely been due to the temporary and repeating changes to be made in the configuration. There has been difficulties in finding a well working position for the components. Requirements of a jump-lift are usually related to space efficiency, safety, ease, time consumption, safety and fluency of process steps related to the jumps, cost of the process and often also ease of later conversion of the construction time elevator into a final elevator. For example, positioning of vertically extending elevator components such as ropes and guide rails have set a lot of limitations to positioning of other components. The space requirements moreover being more or less different in different sites, designing a layout which is well working in many sites, has been problematic.

BRIEF DESCRIPTION OF THE INVENTION

The object of the invention is to introduce an improved elevator arrangement and a method for constructing an elevator. An object is particularly to introduce a solution by which one or more of the above defined problems of prior art and/or drawbacks discussed or implied elsewhere in the description can be solved. An object is particularly to make easier to fulfil requirements of an elevator where the the car traveling zone of the elevator can be extended to reach higher as a construction process progresses.

It is brought forward embodiments particularly by which freedom to position elevator components is increased. It is brought forward embodiments particularly by which adaptability of an arrangement to fit in different sites and differently dimensioned hoistways.

It is brought forward a new elevator arrangement, comprising a hoistway; and one or more vertically oriented guide rail lines in the hoistway for guiding vertical movement of one or more movable elevator units; and one or more movable elevator units mounted in the hoistway vertically movably along one or more guide rail lines, including at least an elevator car, preferably also a counterweight; and a hoisting roping; and a movable support structure mounted in the hoistway for supporting said one or more movable elevator units below it via said hoisting roping; and a hoisting machine on the movable support structure for moving the hoisting roping, for thereby moving said one or more movable elevator units. Said movable support structure comprises a body portion and a shelf structure projecting laterally from the body portion, and the hoisting machine is mounted on the shelf structure.

With this kind of solution one or more of the above mentioned objects can be achieved. With this solution particularly freedom to position elevator components is easier due to increased ability and freedom to adapt and position the hoisting machine, in particular to lie close to a hoistway wall or an equivalent laterally restricting structure, which is advantageous since the hoisting machine is one important key component in determining the position of other components of the elevator arrangement, such as hoisting ropes by which the car is to be suspended. This solution inter alia reduces dependence of the position of the hoisting machine from other variable such as from the structure of the movable support structure and its mounting system, as well as from position of other elevator components. This solution is also suitable for serving well in different sites with differently dimensioned hoistways.

Preferable further details of the elevator arrangement are introduced in the following, which further details can be combined with the arrangement individually or in any combination.

In a preferred embodiment, the shelf structure is a cantilever shelf structure.

In a preferred embodiment, the shelf structure is rigidly connected with the body portion, in particular a horizontal beam thereof from which it projects laterally.

In a preferred embodiment, the shelf structure comprises a beam structure carrying the complete or at least part of the weight of the hoisting machine.

In a preferred embodiment, the complete weight of the hoisting machine is carried by the beam structure or by the beam structure and the at least one auxiliary suspender.

In a preferred embodiment, said beam structure includes horizontally oriented beam portions projecting laterally from the body portion, in particular from a horizontal beam thereof. Preferably, the complete weight of the hoisting machine is particularly carried by the horizontally oriented beam portions, or by the by the horizontally oriented beam portions and at least one auxiliary suspender.

In a preferred embodiment, said beam structure moreover includes vertically oriented or at an inclined angle vertically oriented beam portions projecting vertically or at an inclined angle upwards from the aforementioned horizontally oriented beam portions.

In a preferred embodiment, said beam structure includes two and most preferably particularly only two, horizontally oriented beam portions projecting beside each other laterally from the body portion, in particular from a horizontal beam thereof, the two horizontally oriented beam portions being spaced apart such that a space is formed between them. This structure facilitates rigidity of the shelf structure.

In a preferred embodiment, the shelf structure is suspended from above with at least one auxiliary suspender.

In a preferred embodiment, the arrangement comprises at least one auxilliary suspender engaged with the shelf structure and a part of the movable support structure, which part located higher than the shelf structure.

In a preferred embodiment, the at least one auxiliary suspender comprises an elongated tension member, in particular a rope, a cable, a rod, or a chain, suitable for (and preferably arranged to transmit), transmitting tension between the shelf structure and the aforementioned part of the movable support structure.

In a preferred embodiment, the arrangement, preferably the auxiliary suspender thereof, comprises an adjustable tightening mechanism by which tension of the tension member can be adjusted. The adjustability is preferably provided such that the length of one or more parts of the auxiliary suspender extending between the shelf structure and the aforementioned part of the movable support structure, which part of the movable support structure is located higher than the shelf structure, is adjustable.

In a preferred embodiment, the hoisting machine comprises a motor and a drive wheel rotatable by the motor **8*a*** for moving the hoisting roping. The arrangement comprises a control system connected with the hoisting machine for controlling operation thereof.

In a preferred embodiment, the arrangement comprises plurality of pulleys carried by the shelf structure for guiding passage of the hoisting roping.

In a preferred embodiment, the plurality of pulleys comprises a first side pulley and a second side pulley, the hoisting roping passing on a first side of the drive wheel downwards from the drive wheel and further to the first side pulley and over it, and on a second side of the drive wheel downwards from the drive wheel and further to the second side pulley and over it.

In a preferred embodiment, the horizontal distance between the first side pulley and the second side pulley is adjustable.

In a preferred embodiment, the plurality of pulleys comprises a second first side pulley the hoisting roping passing on a first side of the drive wheel downwards from the drive wheel to the second first side pulley, under it and further to the first first side pulley and over it, and a second second side pulley, the hoisting roping passing downwards from the drive wheel to the second second side pulley, under it and further to the first second side pulley to the first first side pulley and over it.

In a preferred embodiment, the first side pulley is mounted on a first pivotal arm and/or the second side pulley is mounted on a second pivotal arm, the horizontal distance between the first side pulley and the second side pulley being adjustable by pivoting one or both of the arms.

In a preferred embodiment, the arrangement comprises an adjusting mechanism for adjusting pivot angle of the first pivotal arm and/or the second pivotal arm, which preferably comprises an extendable and retractable connecting rod between the first and second pivotal arm.

In a preferred embodiment, one or more of said one or more vertically oriented guide rail lines comprises guide rail sections piled on top of each other, and said hoisting machine is displaceable between a first position and a second position, wherein in said first position the hoisting machine is on top of an uppermost guide rail section of one or more vertically oriented guide rail lines and/or below a guide rail bracket mounted in the hoistway such that the vertical projection of the hoisting machine, in particular the vertical projection of the motor and/or the drive wheel thereof, overlaps with the vertical projection of the guide rail section in question and/or the guide rail bracket in question, and in said second position the hoisting machine is displaced such that the vertical projection of the hoisting machine, in particular the vertical projection of the motor and/or the drive wheel thereof, and the vertical projection of the guide rail section in question and/or the guide rail bracket in question are beside each other (i.e. not overlapping). Displaceability as defined facilitates that the hoisting machine can be placed relatively freely in a position where its drive wheel is such positioned that the hoisting roping passes close to the guide rails. Yet the guide rail line can be extended to continue above the level of the movable support structure. Unblocked hoisting of the movable support structure is also made possible without the hoisting machinery colliding with parts of the guide rail line or the brackets thereof. A guided hoisting along a guide rail line is also facilitated.

In a preferred embodiment, the shelf structure comprises a support base on which the hoisting machine is mounted to rest.

In a preferred embodiment, the support base is mounted, e.g. by welding or by bolts, on the aforementioned beam structure, preferably particularly on the aforementioned one or more vertical or inclined beam portions.

In a preferred embodiment, first and/or second pivotal arm are mounted on the shelf structure in particular on the support base thereof, in particular on the second part thereof.

In a preferred embodiment, the shelf structure comprises a support base on which the hoisting machine is mounted to rest and the support base comprises a vertically open passage, which is on top of an uppermost guide rail section through which opening an additional guide rail section to be installed on top of said uppermost guide rail section fits to extend, in particular when the hoisting machine is in said second position and/or which opening is below a guide rail bracket mounted in the hoistway and through which opening the guide rail bracket fits to move when the movable support structure is hoisted higher in the hoistway such that the support base rises to be level or above the level of the guide rail bracket in question, in particular when the hoisting machine is in said second position.

In a preferred embodiment, when in said second position the hoisting machine blocks said passage.

In a preferred embodiment, the aforementioned vertically open passage is open also laterally so that the aforementioned guide rail bracket mounted in the hoistway fits to extend from a lateral side into the passage. Thereby, the bracket can remain in mechanical connection with the hoistway structure on which it is mounted, e.g. its one end can remain fixed to a wall or a beam of the hoistway, without causing a collision when the movable support structure is hoisted such that the support base rises to be level or above the level of the guide rail bracket in question.

In a preferred embodiment, the vertical projection of the upper face of the uppermost guide rail section of said one or more guide rail lines is completely inside the vertical projection of said passage.

In a preferred embodiment, the hoisting machine is rotatable around a vertical axis.

In a preferred embodiment, the support base comprises a first part, and a second part mounted on the first part rotatably around a vertical axis.

In a preferred embodiment, the hoisting machine is mounted on the second part. Preferably, the second part carries the complete weight of the hoisting machine.

In a preferred embodiment, the first part comprises a lower horizontal support plate and the second part comprises an upper horizontal support plate, these being set against each other, and the support plates are rotatable relative to each other around a vertical axis.

In a preferred embodiment, the first part is mounted, e.g. by welding or by bolts, stationary on the aforementioned plurality of beams, preferably particularly on the aforementioned one or more vertical or inclined beams or beam portions.

In a preferred embodiment, said hoisting machine is pivotally displaceable between the first position and the second position, preferably around at least one horizontal axis.

In a preferred embodiment, said hoisting machine is mounted on the shelf structure, in particular on a support base thereof, pivotally displaceably between a first position and a second position, preferably by one or more hinges.

In a preferred embodiment, said hoisting machine is displaceable between the first position and the second position by horizontal movement, preferably either by linear horizontal movement or by pivoting around a vertical axis. This is an alternative to the above described displaceability by pivoting. Then preferably, the hoisting machine is mounted slidably displaceably between the first position and the second position. Then preferably, the arrangement comprises guide arrangement for guiding movement between said positions, preferably a guide member and a guide rail along which the guide member is movable guided by the guide rail, wherein the hoisting machine comprises said guide member and the support structure (e.g. support platform thereof) comprises the guide rail, or vice versa.

In a preferred embodiment, the movable support structure comprises a mounting mechanism for mounting the movable support structure in a the hoistway immovably at least in downward direction.

In a preferred embodiment, the movable support structure comprises one or more guides mounted on the movable support structure for guiding the vertical movement of the movable support structure during a hoisting thereof along a guide rail line. Hereby, the hoisting of the movable support structure can be performed well controlled and safely.

It is also brought forward a new method for constructing an elevator comprising providing an elevator arrangement as defined in any of the preceding claims; and thereafter using the elevator car for transporting passengers and/or goods; and thereafter hoisting the movable support structure higher in the hoistway; and thereafter using the elevator car for transporting passengers and/or goods.

In a preferred embodiment, the method comprises after said (first) using and before said hoisting displacing the hoisting machine from the first position to the second position, and thereafter installing one or more guide rail sections on top of an uppermost guide rail section of one or more vertically oriented guide rail lines.

In a preferred embodiment, in said installing one or more guide rail sections are installed to extend through the aforementioned vertically open passage.

In a preferred embodiment, each said using the elevator car for transporting passengers and/or goods comprises automatically operating, in particular by an elevator control system, the hoisting machine, to move the elevator car between vertically displaced landings, in particular in response to signals received from one or more interfaces, such as one or more user interfaces operable by a user.

In a preferred embodiment, said providing comprises adjusting the position of the hoisting machine by pivoting it around the vertical axis and/or adjusting the horizontal distance between the first side pulley and the second side pulley.

In a preferred embodiment, the method comprises between the hoisting and second using changing the traveling zone of the elevator car to reach higher in the hoistway.

In a preferred embodiment, during said hoisting vertical movement of the movable support structure is guided by one or more guides mounted on the movable support structure which run along one or more guide rail lines. Hereby, the hoisting can be performed well controlled and safely.

In a preferred embodiment, the car has an interior space suitable for receiving a passenger or passengers, the car preferably being provided with a door movable between open and closed state for opening and closing the interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
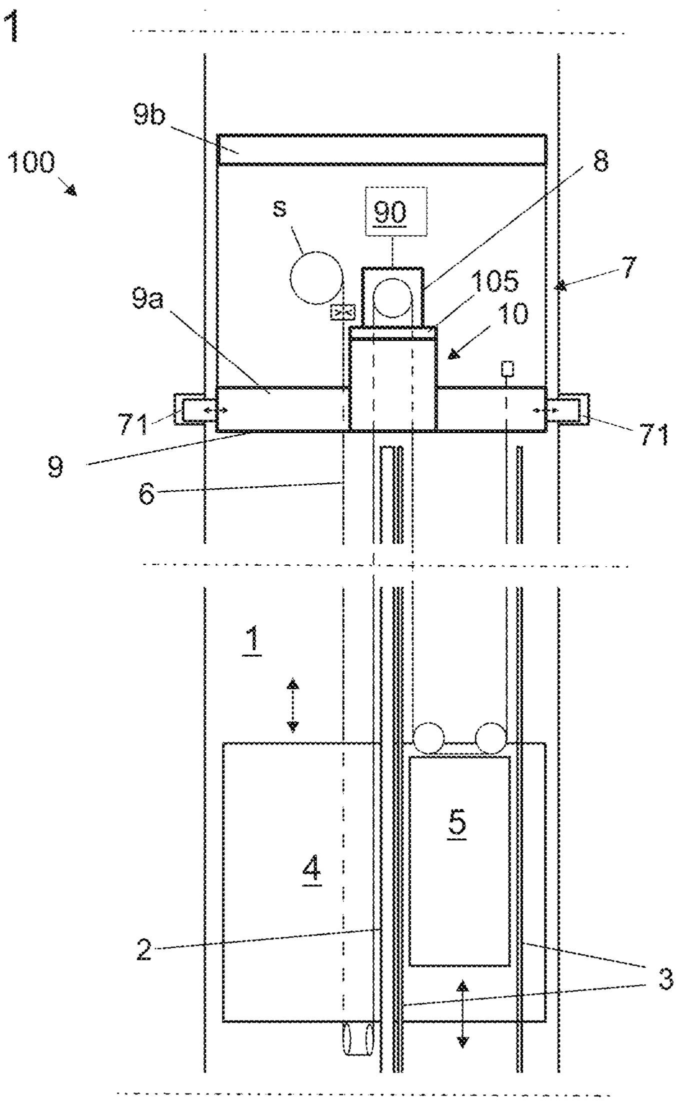
FIG. 1 illustrates schematically an elevator arrangement according to a first embodiment at a stage of a method according to an embodiment where an elevator car of the arrangement is in use.
Figure 6:
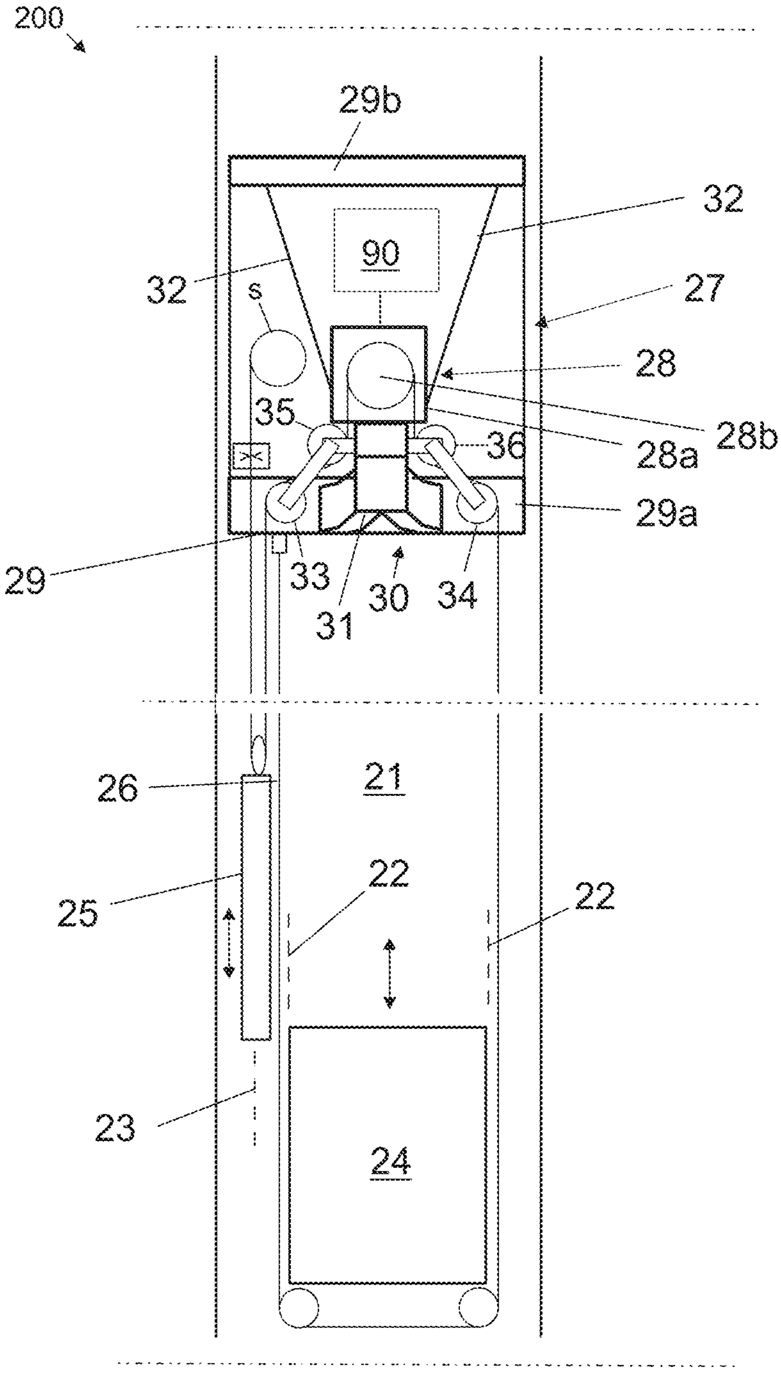
FIG. 6 illustrates schematically an elevator arrangement according to a second embodiment at a stage of a method according to an embodiment where an elevator car of the arrangement is in use.

FIG. 1 illustrates an elevator arrangement 100, in particular a construction time elevator arrangement, according to a first embodiment, and FIG. 6 illustrates an elevator arrangement 200, in particular a construction time elevator arrangement, according to a second embodiment. In both embodiments, the elevator arrangement 100,200 comprises a hoistway 1;21 and vertically oriented guide rail lines 2,3; 22,23 in the hoistway for guiding vertical movement of movable elevator units 4,5. The arrangement comprises movable elevator units 4,5;24,25 mounted in the hoistway 1;21 vertically movably along the guide rail lines 2,3;22,23. The guide rail lines 2,3;22,23 have been illustrated schematically for the sake of clarity. The movable elevator units 4,5;24,25 include in this embodiment an elevator car 4;24 and a counterweight 5;25. Each elevator unit 4,5;24,25 is arranged to take lateral support from guide rail lines for guiding vertical movement of movable elevator unit 4,5;24, 25 in question, in particular by guides (not shown) such as roller guides or sliding guides comprised in the movable elevator unit 4,5;24,25 in question. The elevator arrangement 100,200 moreover comprises a hoisting roping 6;26 connected with the movable elevator units 4,5;24,25, and a movable support structure mounted 7;27 in the hoistway 1;21 for supporting said movable elevator units 4,5;24,25 below it via said hoisting roping 6,26. The elevator arrangement moreover comprises a hoisting machine 8;28 on the movable support structure 7;27 for moving the hoisting roping 6;26, for thereby moving said movable elevator units 4,5;24,25. Said movable support structure 7;27 comprises a body portion 9;29 and a shelf structure 10;30 projecting laterally from the body portion 9;29, and the hoisting machine 8;28 is mounted on the shelf structure 10;30. The shelf structure 10;30 is rigidly connected with the body portion 9;29, in particular with a horizontal beam 9*a*;29*a* thereof from which it projects laterally. The shelf structure 10;30 is a cantilever shelf structure, in particular.

In the preferred embodiments, the hoisting machine 8;28 comprises a motor 8*a*;28*a* and a drive wheel 8*b*;28*b* rotatable by the motor 8*a*;28*a* for moving the hoisting roping 6,26. The hoisting roping passes around the drive wheel 8*b*;28*b*. In the preferred embodiments, the arrangement comprises an elevator control system 90 connected with the hoisting machine 8;28 for controlling operation thereof.

As illustrated in FIGS. 1 and 6, the shelf structure 10;30 comprises a support base 105;31 on which the hoisting machine 8;28 is mounted to rest.

Figure 3:
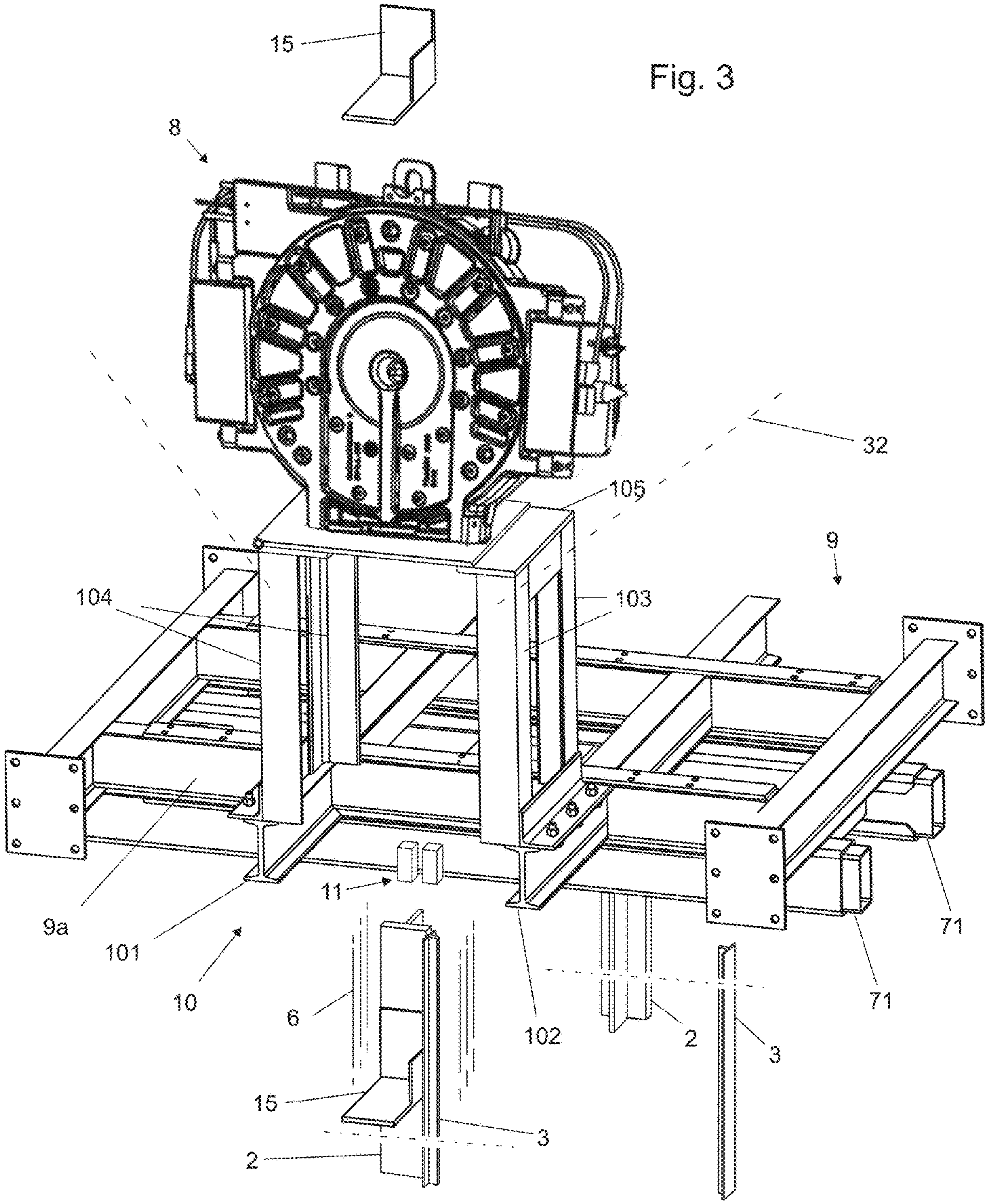
FIG. 3 illustrates three-dimensionally preferred positions of parts of embodiment of FIGS. 1 and 2.
Figure 4:
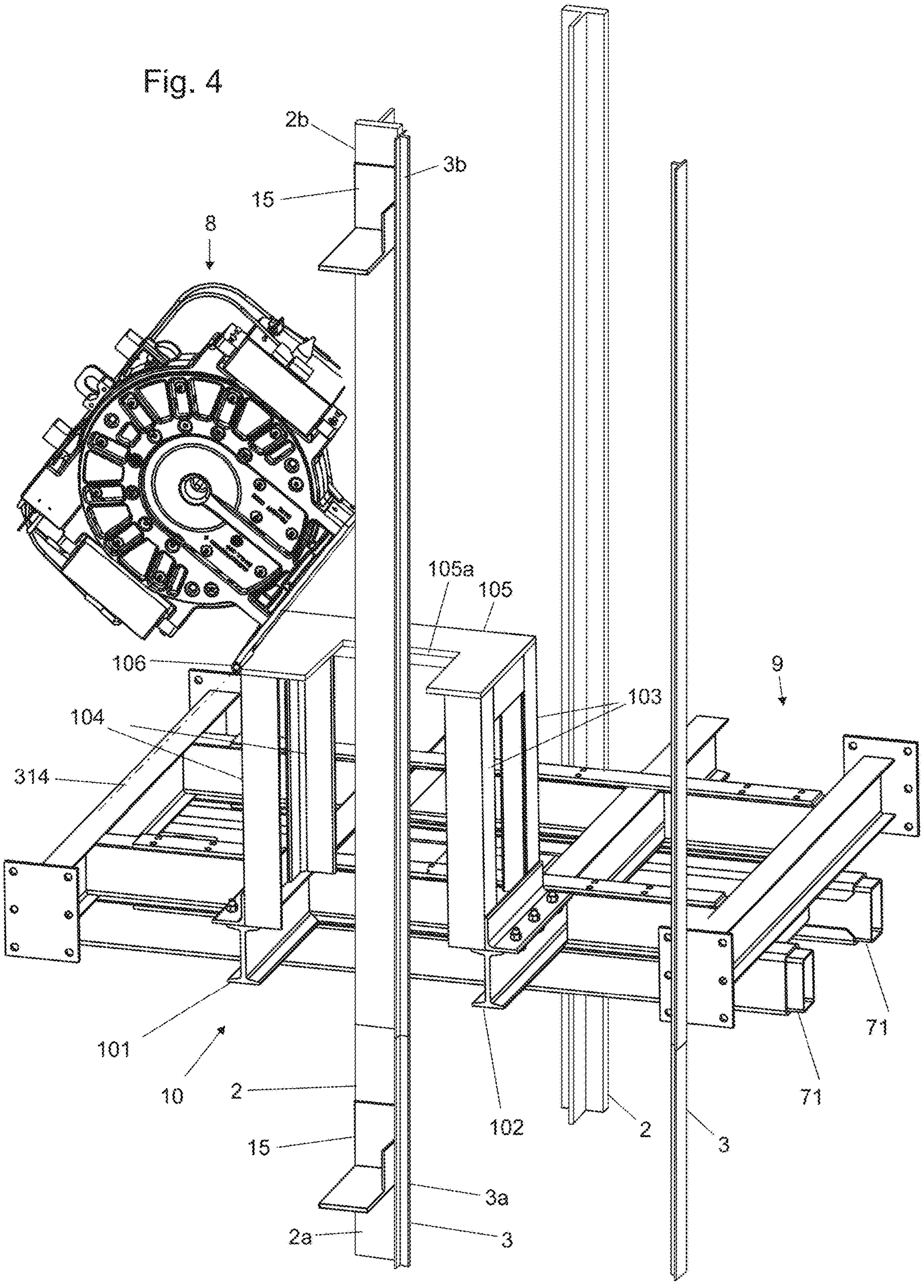
FIG. 4 illustrates three-dimensionally preferred positions of parts of embodiment of FIGS. 1-3 at a stage of a method according to an embodiment where an additional guide rail section has been installed.

In the following, preferred features of embodiment of FIG. 1 are described. As illustrated in FIGS. 3 and 4, each vertically oriented guide rail lines 2,3 of the elevator arrangement comprises guide rail sections 2*a*,3*a* piled on top of each other, and the hoisting machine 8 is displaceable between a first position and a second position. FIG. 3 illustrates the hoisting machine 8 in its first position and FIG. 4 in its second position. In said first position the hoisting machine 8 is on top of an uppermost guide rail section 2*a*,3*a* of one or more vertically oriented guide rail lines 2,3 and below a guide rail bracket 15 mounted in the hoistway 1 such that the vertical projection of the hoisting machine 8, in particular the vertical projection of the motor and/or the drive wheel thereof, overlaps with the vertical projection of the guide rail section 2*a*,3*a* in question and the guide rail bracket 15 in question. In said second position the hoisting machine 8 is displaced such that the vertical projection of the hoisting machine 8, in particular the vertical projection of the motor and/or the drive wheel thereof, and the vertical projection of the guide rail section 2*a*,3*a* in question and the guide rail bracket 15 in question are beside each other (i.e. not overlapping). Preferably, here particularly the vertical projection of the guide rail section equals the vertical projection of the upper end face(s) thereof. Displaceability as defined facilitates that the hoisting machine 8 can be placed relatively freely in a position where its drive wheel is such positioned that the hoisting roping 6 passes close to the guide rails. This also facilitates freedom to place the hoisting machine so that in the end of the construction time involving jumps and hoistings of the movable support structure, the final machinery, which can even be the same as the construction time during, can be placed to rest supported by the guide rails used already during construction time. Likewise, it is facilitated that substantial rerouting of the hoisting roping often necessary in the conversion can be obviated since hoisting machine position need not necessarily shifted laterally. Each of these facilitate a swift and efficient conversion after the construction phase.

In order to facilitate sound support and the aforementioned displaceability, the support base 105 comprises a vertically open passage 105*a*, which ison top of said uppermost guide rail section 2*a*,3*a* and through which open passage 105*a* an additional guide rail section to be installed on top of said uppermost guide rail section fits to extend when the hoisting machine is in said second position. The vertically open passage 105*a* is below a guide rail bracket 15 mounted in the hoistway. The guide rail bracket 15 fits to move through the passage 105*a* when the movable support structure 7 is hoisted higher in the hoistway 1 such that the support base 105 rises to be level or above the level of the guide rail bracket 15 in question, in particular when the hoisting machine 8 is in said second position. In said second position the hoisting machine 8 blocks said passage 105*a*, at least in vertical direction.

The aforementioned vertically open passage 105*a* is preferably open also laterally, as illustrated, so that the aforementioned guide rail bracket 15 mounted in the hoistway fits to extend from a lateral side into the passage 105*a*. Thereby, the bracket 15 can remain in mechanical connection with the hoistway structure on which it is mounted, e.g. its one end can remain fixed to a wall or a beam of the hoistway, without causing a collision when the movable support structure 7 is hoisted such that the support base 7 rises to be level or above the level of the guide rail bracket 15 in question.

Figure 2:
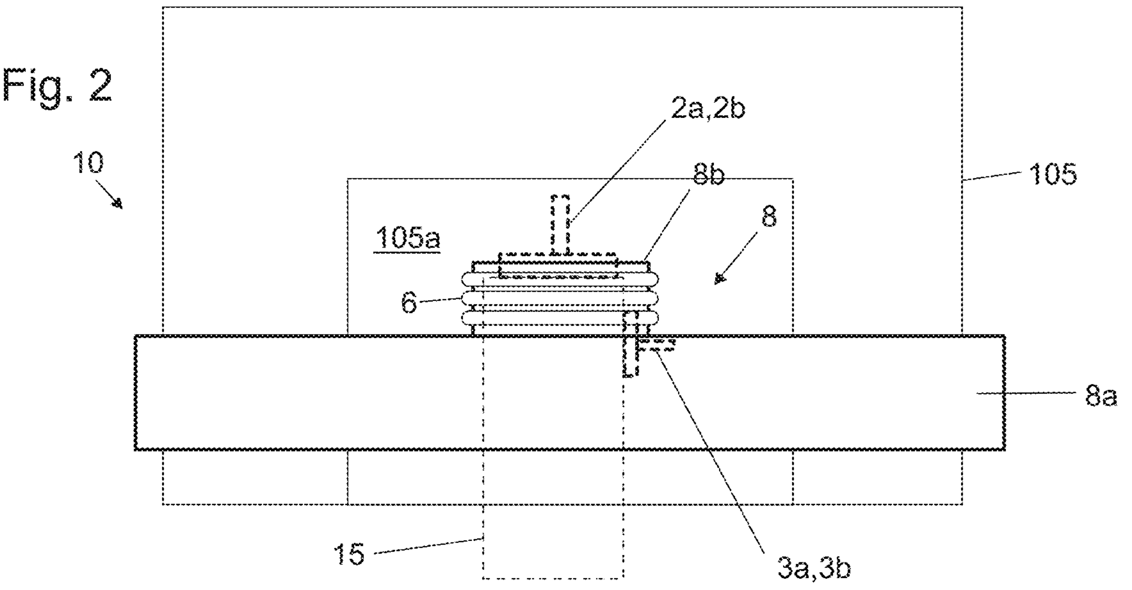
FIG. 2 illustrates schematically preferred positions of parts of embodiment of FIG. 1 as viewed from above.

As schematically illustrated in FIG. 2, preferably the projection of the upper face of the uppermost guide rail section 2*a*,3*a* of said one or more guide rail lines 2,3 is completely inside the vertical projection of said passage 105*a*. A bottom plate of the machinery 8 is left invisible so as to show more clearly the passage 105*a*.

In the preferred embodiment of FIG. 3, preferably the hoisting machine 8 is pivotally displaceable between said first position and said second position, preferably around at least one horizontal axis 314 as illustrated in FIG. 4. In the preferred embodiment of FIG. 3, this is implemented such that said hoisting machine is mounted on the shelf structure 10, in particular on a support base 105 thereof, pivotally displaceably, between the first position and the second position by one or more hinges 106.

As illustrated in FIG. 3, the shelf structure 10 comprises a beam structure 101-104 carrying the complete or at least part of the weight of the hoisting machine 8.

Said beam structure 101-104 includes horizontally oriented beam portions projecting laterally from the body portion 9. The complete weight of the hoisting machine 8 is particularly carried by the horizontally oriented beam portions in the embodiment of FIG. 1. or by the horizontally oriented beam portions and the at least one auxiliary suspender 32.

Said beam structure 101-104 includes two and in the presented case particularly only two, horizontally oriented beam portions 101,102 projecting beside each other laterally from the body portion 9, in particular from a horizontal beam 9*a* thereof, the two horizontally oriented beam portions 101,102 being spaced apart such that a space is formed between them. This structure facilitates rigidity of the shelf structure 10.

Said beam structure 101-104 moreover includes vertically oriented beam portions 103,104 projecting vertically upwards from the aforementioned horizontally oriented beam portions 101,102.

As above mentioned, the shelf structure 10 comprises a support base 105 on which the hoisting machine 8 is mounted to rest. The support base 105 is preferably mounted, e.g. by welding or by bolts, with the aforementioned beam structure, preferably particularly on the aforementioned one or more vertical or inclined beam portions 103,104. Hereby, it can be disposed in an elevated position relative to level on which the shelf connects with the body portion 9.

As illustrated in FIG. 3, the movable support structure 7 comprises one or more guides 11 (only one showed) mounted on the movable support structure 7 for guiding the vertical movement of the movable support structure 7 during a hoisting thereof along a guide rail line 2, which is in the illustrated embodiment a guide rail line 2 of the elevator car. Each said guide 11,31 is suitable for running along a guide rail line 2, which is in the illustrated embodiment the guide rail lines 2 of the elevator car. For this purpose, each said guide can be, for example, a slide guide as illustrated, or alternatively a roller guide, which are as such known components of an elevator.

Figure 5:
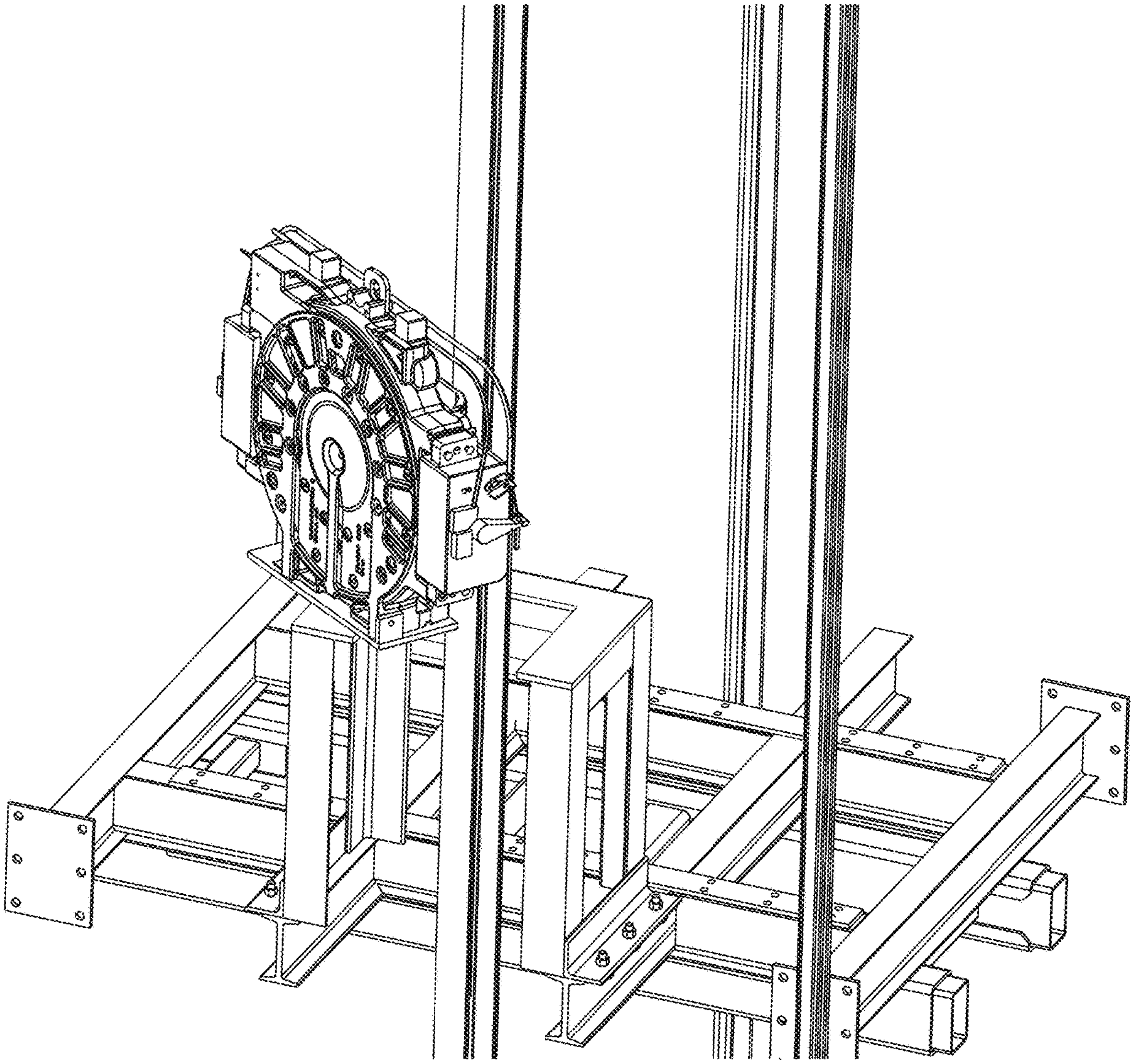
FIG. 5 illustrates three-dimensionally alternative positions of parts of embodiment of FIGS. 1 and 2, at a stage of a method according to an embodiment where an additional guide rail section has been installed.

FIG. 5 illustrates an alternative way to displace the hoisting machine 8. In this alternative embodiment, said hoisting machine is displaceable between the aforementioned first position and the second position by horizontal movement, such as either by linear horizontal movement or by pivoting around a vertical axis.

In FIG. 5, the hoisting machine is mounted slidably displaceably between the first position and the second position. For facilitating the displacing, the arrangement can comprise a guide arrangement for guiding movement of the hoisting machine 8 between said positions, such as a guide member rigidly connected with the hoisting machine 8 and a guide rail rigidly connected with the support base, or vice versa, and wherein the guide member is movable guided by the guide rail.

Figure 7:
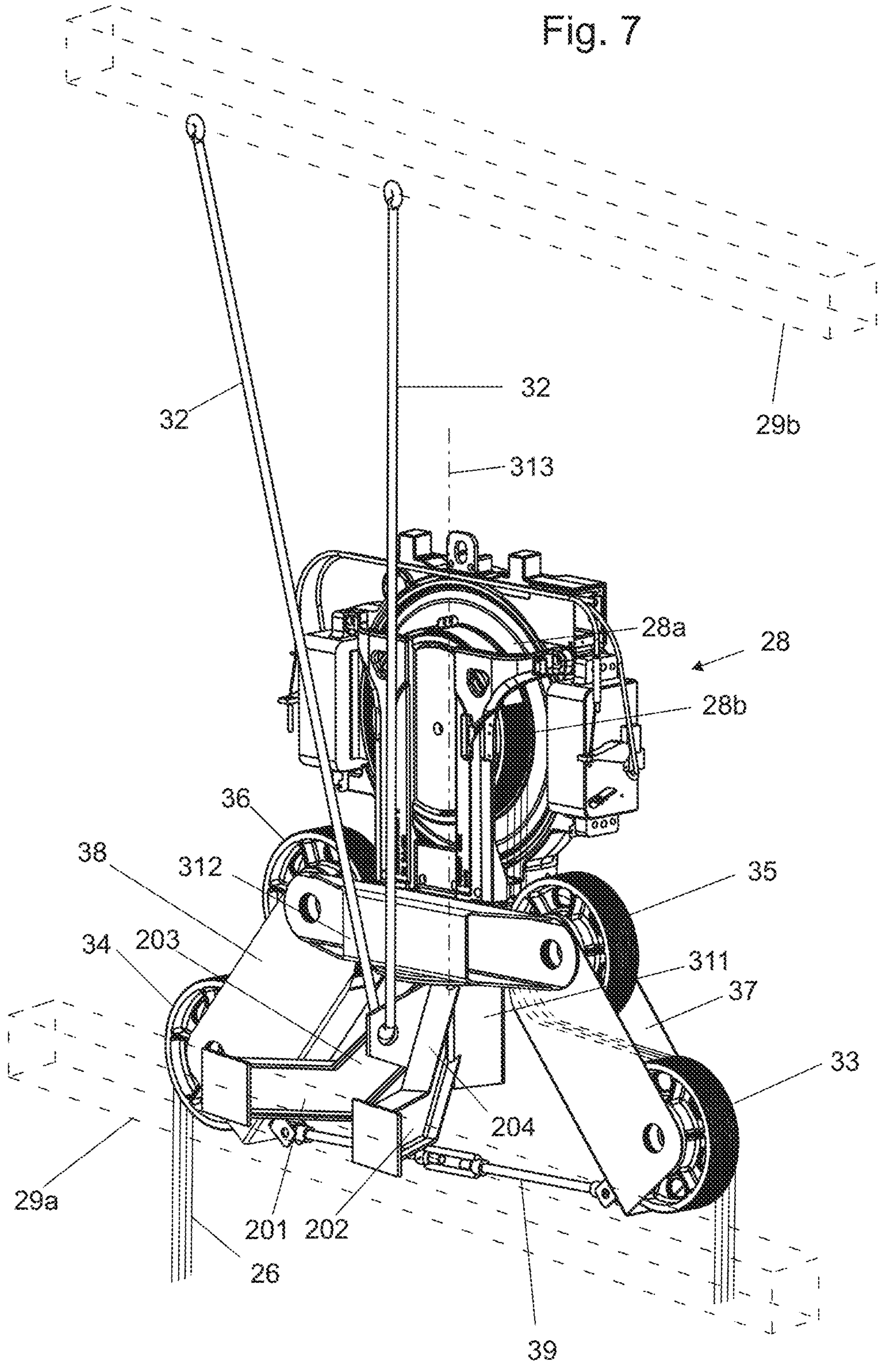
FIG. 7 illustrates three-dimensionally preferred details of parts of embodiment of FIG. 6.

In the following, preferred features of embodiment of FIG. 6 are described referring to FIGS. 6-8. As illustrated in FIG. 7, the shelf structure 30 comprises a beam structure 201-204 carrying part of the weight of the hoisting machine (8). Said beam structure 201-204 includes horizontally oriented beam portions 201,202 projecting laterally from the body portion 29 in particular from a horizontal beam 29*a* thereof. The complete weight of the hoisting machine 8 is particularly carried by the horizontally oriented beam portions 201,202 and at least one auxiliary suspender 32, in the embodiment of FIG. 7.

Said beam structure 201-204 comprises two, and in the presented case particularly only two, of said horizontally oriented beam portions 201,202. These project beside each other laterally from the body portion 29, in particular from a horizontal beam 29*a* thereof. The two horizontally oriented beam portions 201,202 are spaced apart such that a space is formed between them. This structure facilitates rigidity of the shelf structure 30.

Said beam structure 201-204 moreover includes at an inclined angle vertically oriented beam portions 203,204 projecting at an inclined angle upwards from the aforementioned horizontally oriented beam portions 201,202.

As above mentioned, the shelf structure 30 comprises a support base 31 on which the hoisting machine 8 is mounted to rest. The support base 31 is preferably mounted, e.g. by welding or by bolts, on the aforementioned beam structure 201-204, preferably particularly on the aforementioned one or more vertical or inclined beam portions 203,204. Hereby, it can be disposed in an elevated position relative to the level on which the shelf connects with the body portion 29.

In the preferred embodiment of FIG. 6, the shelf structure 30 is partly suspended from above with at least one auxiliary suspender 32. For this purpose, as more precisely illustrated in FIGS. 7 and 8, the arrangement comprises at least one auxiliary suspender 32 engaged with the shelf structure 30 as well as with a part 29*b* of the movable support structure 27, which part 29*b* of the movable support structure 27 is located higher than the shelf structure 30. This facilitates rigidity of the shelf structure 30.

The auxiliary suspender 32 comprises an elongated tension member 32*a*, in particular a rope, a cable, a rod, or a chain, for transmitting tension between the shelf structure 30 and the aforementioned part 29*b* of the movable support structure 27.

Said at least one auxiliary suspender 32 can comprise one or two of said auxiliary suspenders, such as tension members as defined.

Preferably, auxiliary suspender 32 comprises an adjustable tightening mechanism 32*b* by which tension of the tension member 32*a* can be adjusted. Hereby, its bearing ability can be adjusted as needed. It can also be provided a pretension.

The adjustability is preferably provided such that the length of one or more parts of the auxiliary suspender 32 extending between the shelf structure 30 and the aforementioned part 29*b* of the movable support structure 27, which part 29*b* of the movable support structure 27 is located higher than the shelf structure 30, is adjustable.

Figure 12A:
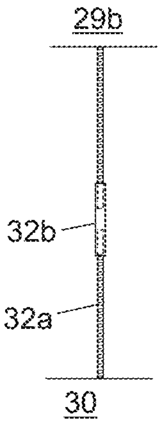
FIGS. 12*a*-12*c* illustrate alternative preferred details of an auxiliary suspender.

The adjustment of said length of one or more parts of the auxiliary suspender 32, when it comprises a rod 32*a*, in particular two rods 32*a*, is illustrated in FIG. 12*a*. In this embodiment, the rods are threaded with different handed threads, and said length of one or more parts of the auxiliary suspender 32 is adjustable by rotating a central piece 32*b* to which the two threaded rods 32*a* are screwed from opposite sides with different handed threads.

Figure 12B:
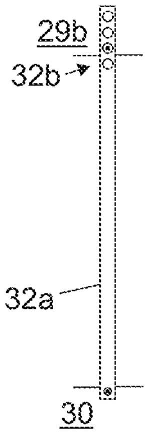

The adjustment of said length of one or more parts of the auxiliary suspender 32, when it comprises a rod 32*a*, in particular one rod 32*a*, is illustrated in FIG. 12*b*. In this embodiment, releasable fixing means are mounted on one of the parts 30;29*b*, here part 29*b*, between which parts 30;29*b* the auxiliary suspender 32 extends for transmitting tension between them, which releasable fixing means are engageable with any one of multiple points of the tension member 32*a*, the points being spaced apart in longitudinal direction of the tension member 32*a*. In the presented embodiment, the tension member comprises plurality of openings spaced apart in longitudinal direction of the tension member 32*a*, and the releasable fixing means comprises a pin insertable into an opening of the tension member.

Figure 12C:
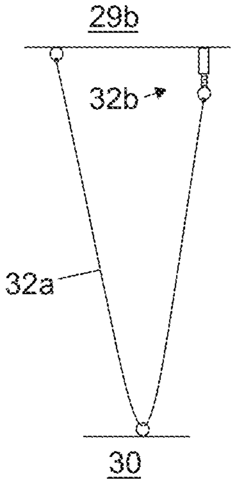

The adjustment of said length of one or more parts of the auxiliary suspender 32, when the tension member **32*a* is a rope, a cable or a chain 32*a*, is illustrated in FIG. 12*c*. In this embodiment, the tension member 32*a* is engaged via a tightening mechanism 32*b* with one of the parts 30;29*b* between which the auxiliary suspender 32 extends for transmitting tension between them. The tightening mechanism 32*b* is actuatable to pull the tension member 32*a* tighter. In particular, tightening mechanism 32*b* comprises a nut mounted on said one of the parts 30;29*b* and a hanger on which the tension member 32*a*** is fixed, the hanger being screwable into or out from the nut so as to adjust the tightness of the tension member.

The arrangement preferably comprises plurality of pulleys 33-36 mounted on and carried by the shelf structure 30 for guiding passage of the hoisting roping 26, as illustrated in FIG. 6.

The plurality of pulleys 33-36 comprises a first side pulley 33 and a second side pulley 34, the hoisting roping 26 passing on a first side of the drive wheel **8*b* downwards from the drive wheel 8*b* and further to the first side pulley 33 and over it, and on a second side of the drive wheel 8*b* downwards from the drive wheel 8*b* and further to the second side pulley 34** and over it.

For ensuring a substantial contact angle, it is preferred that the plurality of pulleys 33-36 comprises, as illustrated, a second first side pulley (35) the hoisting roping passing on a first side of the drive wheel **8*b* downwards from the drive wheel (8*b*) to the second first side pulley (35), under it and further to the first first side pulley (33) and over it, and a second second side pulley (36), the hoisting roping passing downwards from the drive wheel (8*b*) to the second second side pulley (36), under it and further to the first second side pulley (34) to the first first side pulley (33**) and over it.

The horizontal distance between the first side pulley 33 and the second side pulley 34 is preferably adjustable, as illustrated in FIG. 7. Hereby, adaptability of the arrangement to fit in different sites and differently dimensioned hoistways is substantially increased.

The adjustability of the horizontal distance mentioned above is implemented preferably as illustrated in FIG. 7, in particular such that the first side pulley 33 is mounted on a first pivotal arm 37 and the second side pulley 34 is mounted on a second pivotal arm 38, the horizontal distance between the first side pulley 33 and the second side pulley 34 being adjustable by pivoting one or both of the arms 37,38. The adjustability could be facilitated also if only one of said pulleys 33,34 is mounted on a pivotal arm.

In the preferred embodiment illustrated in FIG. 7, the arrangement moreover comprises an adjusting mechanism 39 for adjusting pivot angle of the first pivotal arm 37 and/or the second pivotal arm 38, which preferably comprises an extendable and retractable connecting rod 39 between the first and second pivotal arm 37,38.

In the preferred embodiment illustrated in FIG. 7, the hoisting machine 28 is moreover rotatable around a vertical axis 313. Hereby, adaptability of the arrangement to fit in different sites and differently dimensioned hoistways is substantially increased. In the preferred embodiment illustrated in FIG. 7, this is implemented such that the support base 31 comprises a first part 311, and a second part 312, which is mounted on the first part 311 rotatably around a vertical axis 313. The hoisting machine 8 is mounted on the second part 312. The second part 312 carries the complete weight of the hoisting machine 8. The arrangement moreover preferably comprises a locking mechanism for locking the first and second part 311,312 to be immovable relative to each other, such as bolt and nut adapted to fix the first and second part 311,312 immovably together.

In the preferred embodiment illustrated in FIG. 7, the first part 311 comprises a lower horizontal support plate and the second part 312 comprises an upper horizontal support plate, these being set against each other, the upper support plate on top of the lower horizontal support plate, and these support plates are rotatable relative to each other around a vertical axis 313.

The first and second pivotal arm 37;38 are preferably mounted on the shelf structure 30 in particular on the support base 31 thereof, in particular on the second part 312 thereof. This is however not necessary as they could be also mounted on a different part of the shelf structure 30.

Figure 8:
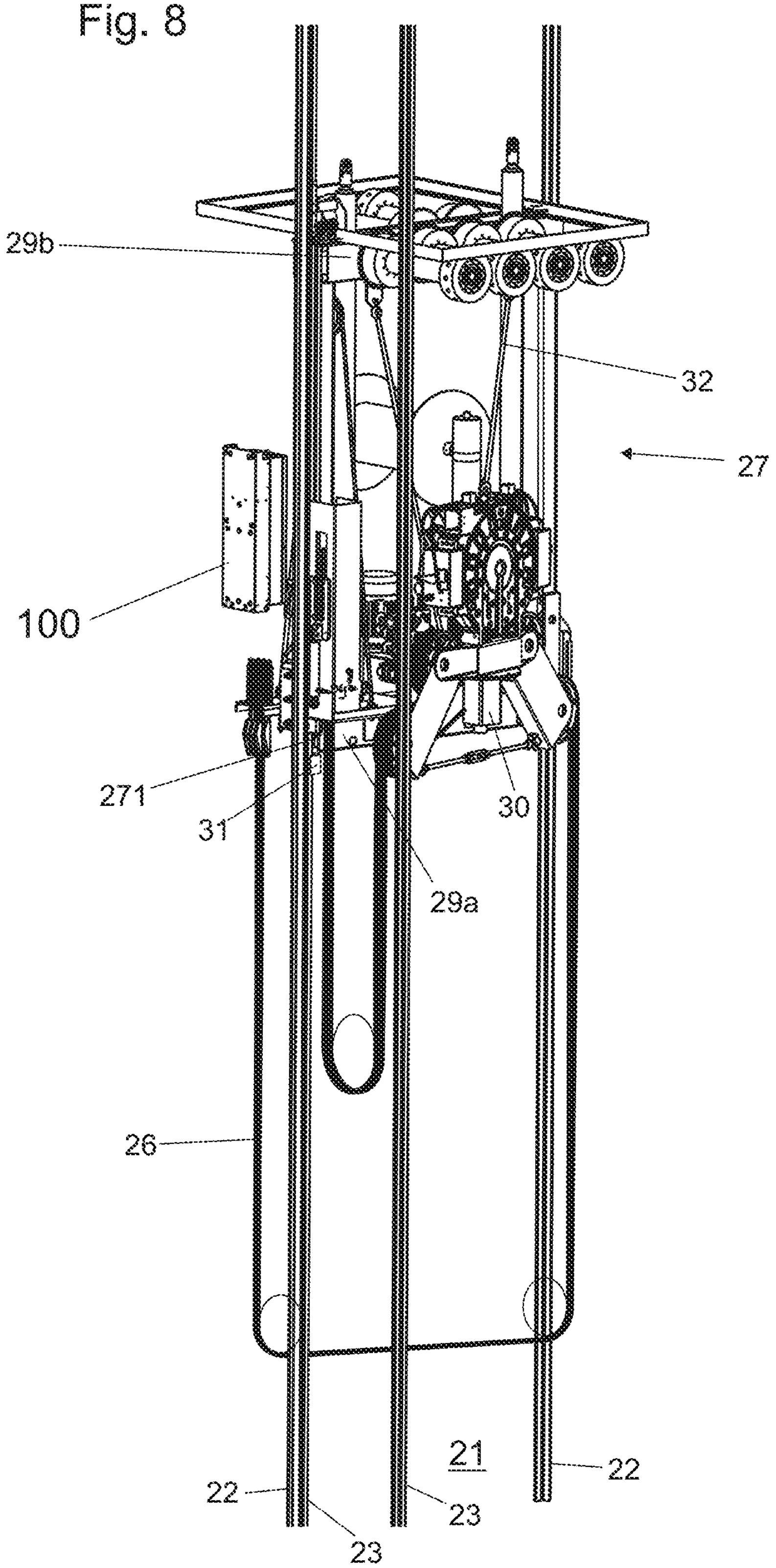
FIG. 8 illustrates three-dimensionally preferred details of parts of embodiment of FIG. 6.

As illustrated in FIG. 8, the movable support structure 27 comprises one or more guides 31 (only one schematically showed) mounted on the movable support structure 7;27 for guiding the vertical movement of the movable support structure 7 during a hoisting thereof along a guide rail line 22, which is in the illustrated embodiment a guide rail line 22 of the elevator car (not showed). Each said guide 11,31 is suitable for running along a guide rail line 2, which is in the illustrated embodiment a guide rail line 2 of the elevator car. For this purpose each said guide 31 can be, for example, a slide guide as illustrated, or alternatively a roller guide, which are as such known components of an elevator.

Figure 9:
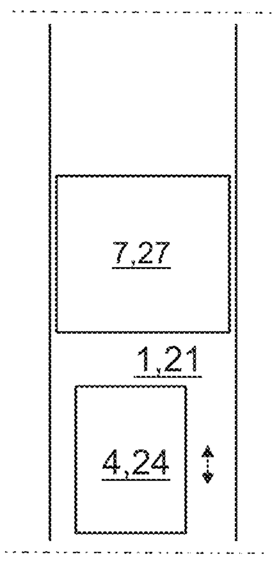
FIG. 9 illustrates a step of a method according to an embodiment where an elevator car is used for transporting below a movable support structure mounted in a hoistway.
Figure 10:
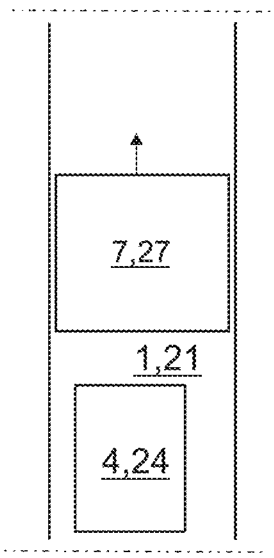
FIG. 10 illustrates a step of a method according to an embodiment where the movable support structure is hoisted.
Figure 11:
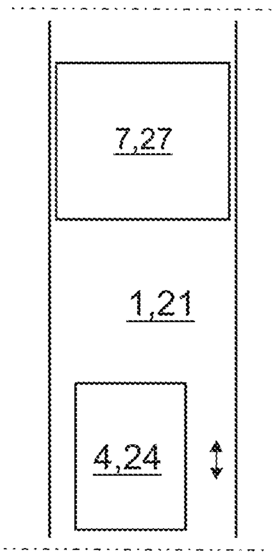
FIG. 11 illustrates a step of a method according to an embodiment where an elevator car is used for transporting below a movable support structure mounted after hoisting in a higher position in the hoistway.

In an embodiment of a method for constructing an elevator, the method comprises providing an elevator arrangement 100 as described referring to the embodiment of FIG. 1, or an elevator arrangement 200 as described referring to the embodiment of FIG. 6. After said providing, the method comprises using (also referred to as "first using") the elevator car 4,24 for transporting passengers and/or goods. This step is illustrated in FIG. 9. During said first using, construction work is performed in the hoistway 1,21 above the movable support structure 7;27. After said first using, in particular when the construction work has reached a suitable readiness, the method comprises hoisting the movable support structure 7;27 higher in the hoistway 1;21. This step is illustrated in FIG. 10. The hoisting can be performed by any known means, such as by a crane or a hoisting arrangement provided in the hoistway 1 above the the movable support structure 7;27 or by a climbing mechanism mounted on the movable support structure 7;27. These are however mere examples and the hoisting could also be otherwise performed. After said hoisting, the method comprises using (also referred to as "second using") the elevator car 4,24 for transporting passengers and/or goods. This step is illustrated in FIG. 11. The sequence of the first using, hoisting, and second using can be repeated one or more times. Between each hoisting and second using, the method preferably comprises changing the traveling zone of the elevator car 4,24 to reach higher in the hoistway 1,21.

During each using, the mounting mechanism 71,271 for mounting the movable support structure 7;27 in a the hoistway immovably at least in downward direction is maintained in its first state and during hoisting in its second state as described earlier above.

The additional rope possibly needed can be taken from a rope storage s, which can be preferably mounted on the movable support structure 7;27, for example, or alternatively elsewhere, such as on a landing or in the pit of the hoistway.

In the method, generally preferably, each said using the elevator car 4,24 for transporting passengers and/or goods comprises automatically operating, in particular by an elevator control system 90, the hoisting machine (8), to move the elevator car 4;24 between vertically displaced landings, in particular in response to signals received from one or more interfaces, such as one or more user interfaces operable by a user. The interface can comprise a button panel, or a touch screen of a stationary panel or a mobile phone, for instance.

In the method, preferably during said hoisting vertical movement of the the movable support structure 7;27 is guided by one or more guides 11;31 mounted on the movable support structure 7;27 which run along one or more guide rail lines 2,3;22,23, such as preferably the guide rail lines 2,22 of the elevator car. The guides 11;31 have been illustrated schematically in FIGS. 3 and 6. Each of said one or more guides 11;31 can be roller or slide guides for example, running along a guide rail line 2,3;22,23.

In a method where the arrangement is as described referring to the embodiment of FIG. 1, the method comprises after said first using and before said hoisting, displacing the hoisting machine 8 from the first position to the second position, and thereafter installing one or more (additional) guide rail sections on top of each said uppermost guide rail section 2*a*,3*a*. This makes it possible to extend the guide rail line 2,3 to extend above the level of the movable support structure 7 even though the hoisting machine 8 is located on top of the previously installed guide rail sections during the construction-time use of the elevator. Hereby, guidance of the movable support structure 7 can also with this kind of layout be performed by aid of guide rail lines. In said installing, particularly preferably one or more guide rail sections are installed to extend through said vertically open passage 105*a*.

In a method where the arrangement is as described referring to the embodiment of FIG. 1, said providing comprises adjusting the position of the hoisting machine 8 by pivoting it around the vertical axis 313 and/or adjusting the horizontal distance between the first side pulley 33 and the second side pulley 34.

Generally, the movable support structure 7;27 preferably comprises a mounting mechanism 71,271 for mounting the movable support structure 7;27 in a the hoistway immovably at least in downward direction. Preferably, the mounting mechanism 71,271 is shiftable between a first state and a second state state, where in said first state said mechanism engages a stationary structure to take support from it, the stationary structure preferably being a wall or other stationary structure of the hoistway or a guide rail or a guide rail bracket mounted in the hoistway, and in said second state said mechanism is released from said engagement. For example, in FIG. 1, the mounting mechanism comprises arms which are extendable into pockets formed in the wall of the hoistway, and retractable out from said pockets, the first state here being a state where arms extend into the pockets and the second state being here a state where arms have been retracted out from the pockets. The embodiment of FIG. 6 can be made to have similar mounting mechanism as illustrated in FIG. 1. Alternatively, the mounting mechanism of the embodiment of FIG. 1 or FIG. 6, could be such that it comprises one or more grippers mounted on the movable support structure 7;27 and the first state is a state where the one or more grippers grip one or more guide rails and the second state a state where said one or more grippers do not grip guide rails, or such that instead of extending into pockets, in said first state the arms extend over guide rail brackets thus engaging them to take support from them.

The movable elevator units 4,5;24,25 include at least an elevator car 4;24 and preferably a counterweight 5;25, but this is not necessary since counterweightless elevators also exist, and the invention could be implemented also in context where the hoisting function is implemented without a counterweight.

Use of auxiliary suspenders 32 for supporting of the shelf structure 10,30 are not necessary in the embodiments of FIG. 1 or 6. In FIG. 3 a broken line illustrates where the suspenders could be located in the embodiment of FIG. 1, if they are chosen to be used.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. An elevator arrangement, comprising a hoistway; and one or more vertically oriented guide rail lines in the hoistway for guiding vertical movement of one or more movable elevator units; and one or more movable elevator units mounted in the hoistway vertically movably along one or more guide rail lines, including at least an elevator car; and a hoisting roping; and a movable support structure mounted in the hoistway for supporting said one or more movable elevator units below it via said hoisting roping;

a hoisting machine on the movable support structure for moving the hoisting roping, for thereby moving said one or more movable elevator units; and wherein said movable support structure is configured to move independently of the elevator car and comprises a body portion, a shelf structure projecting laterally from the body portion, and at least one auxiliary suspender engaged with the shelf structure and a part of the movable support structure, which part is located higher than the shelf structure, and the hoisting machine is mounted on the shelf structure.

2. An elevator arrangement according to claim 1, wherein the shelf structure comprises a beam structure carrying the complete or at least part of the weight of the hoisting machine.

3. An elevator arrangement according to claim 2, wherein said beam structure includes horizontally oriented beam portions projecting laterally from the body portion, in particular from a horizontal beam thereof.

4. An elevator arrangement according to claim 2, wherein said beam structure further includes vertically oriented or at an inclined angle vertically oriented beam portions projecting vertically or at an inclined angle upwards from the aforementioned horizontally oriented beam portions.

5. An elevator arrangement according to claim 1, wherein the at least one auxiliary suspender comprises an elongated tension member, including a rope, a cable, a rod, or a chain, suitable for transmitting tension between the shelf structure and the aforementioned part of the movable support structure, the arrangement including an adjustable tightening mechanism by which tension of the elongated tension member can be adjusted.

6. An elevator arrangement according to claim 1, wherein the hoisting machine comprises a motor and a drive wheel rotatable by the motor for moving the hoisting roping.

7. An elevator arrangement according to claim 1, wherein the arrangement comprises plurality of pulleys carried by the shelf structure for guiding passage of the hoisting roping.

8. An elevator arrangement according to claim 7, wherein the plurality of pulleys comprises a first side pulley and a second side pulley, the hoisting roping passing on a first side of the drive wheel downwards from the drive wheel and further to the first side pulley and over it, and on a second side of the drive wheel downwards from the drive wheel and further to the second side pulley and over it.

9. An elevator arrangement according to claim 8, wherein a horizontal distance between the first side pulley and the second side pulley is adjustable.

10. An elevator arrangement according to claim 8, wherein the first side pulley is mounted on a first pivotal arm and/or the second side pulley is mounted on a second pivotal arm, the horizontal distance between the first side pulley and the second side pulley being adjustable by pivoting one or both of the arms.

11. An elevator arrangement comprising:

a hoistway;

one or more vertically oriented guide rail lines in the hoistway for guiding vertical movement of one or more movable elevator units;

one or more movable elevator units mounted in the hoistway vertically movably along one or more guide rail lines, including at least an elevator car;

a hoisting roping;

a movable support structure mounted in the hoistway for supporting said one or more movable elevator units below it via said hoisting roping;

a hoisting machine on the movable support structure for moving the hoisting roping, for thereby moving said one or more movable elevator units, wherein said movable support structure is configured to move independently of the elevator car and comprises a body portion, and a shelf structure projecting laterally from the body portion, and the hoisting machine is mounted on the shelf structure; and wherein one or more of said one or more vertically oriented guide rail lines comprises guide rail sections piled on top of each other, and said hoisting machine is displaceable between a first position and a second position, wherein in said first position the hoisting machine is on top of an uppermost guide rail section of one or more vertically oriented guide rail lines and/or below a guide rail bracket mounted in the hoistway such that the vertical projection of the hoisting machine, in particular the vertical projection of a motor and/or the drive wheel thereof, overlaps with a vertical projection of the guide rail section in question and/or the guide rail bracket in question, and in said second position the hoisting machine is displaced such that the vertical projection of the hoisting machine, in particular the vertical projection of the motor and/or the drive wheel thereof, and the vertical projection of the guide rail section in question and/or the guide rail bracket in question are beside each other.

12. An elevator arrangement according to claim 11, wherein the shelf structure comprises a support base on which the hoisting machine is mounted to rest.

13. An elevator arrangement according to claim 12, wherein the support base is mounted on the aforementioned beam structure, configured to be fastened on the aforementioned one or more vertical or inclined beam portions.

14. An elevator arrangement according to claim 12, wherein the support base comprises a vertically open passage, which is on top of said uppermost guide rail section and through which an additional guide rail section to be installed on top of said uppermost guide rail section fits to extend, in particular when the hoisting machine is in said second position and/or which is below a guide rail bracket mounted in the hoistway and through which the guide rail bracket fits to move when the movable support structure is hoisted higher in the hoistway such that the support base rises to be level or above the level of the guide rail bracket in question, in particular when the hoisting machine is in said second position.

15. An elevator arrangement according to claim 11, wherein the hoisting machine is rotatable around a vertical axis.

16. An elevator arrangement according to claim 11, wherein said hoisting machine is pivotally displaceable between the first position and the second position around at least one horizontal axis.

17. A method for constructing an elevator comprising providing an elevator arrangement as defined in claim 11; and thereafter using the elevator car for transporting passengers and/or goods; and thereafter hoisting the movable support structure higher in the hoistway; and thereafter second using the elevator car for transporting passengers and/or goods.

18. A method according to claim 17, wherein the method comprises after said (first) using and before said hoisting, displacing the hoisting machine from the first position to the second position, and thereafter installing one or more guide rail sections on top of an uppermost guide rail section of one or more vertically oriented guide rail lines.

19. A method according to claim 18, wherein installing the one or more guide rail sections includes installing the one or more guide rail sections to extend through a vertically open passage.

20. A method according to claim 17, wherein said providing comprises adjusting a position of the hoisting machine by pivoting it around a vertical axis and/or adjusting a horizontal distance between a first side pulley and a second side pulley.

21. A method according to claim 17, wherein during said hoisting, vertical movement of the movable support structure is guided by one or more guides mounted on the movable support structure which run along one or more guide rail lines.

* * * * *